(12) United States Patent
Guzman et al.

(10) Patent No.: US 11,816,104 B2
(45) Date of Patent: Nov. 14, 2023

(54) METHOD AND SYSTEM FOR EVALUATING EXPRESSIONS

(71) Applicant: YAHOO AD TECH LLC, Dulles, VA (US)

(72) Inventors: David Guzman, Dublin (IE); John McClean, Dublin (IE); Nikita Sapozhnikov, Dublin (IE)

(73) Assignee: YAHOO AD TECH LLC, Dulles, VA (US)

( * ) Notice: Subject to any disclaimer, the term of this patent is extended or adjusted under 35 U.S.C. 154(b) by 112 days.

(21) Appl. No.: 16/235,161

(22) Filed: Dec. 28, 2018

(65) Prior Publication Data

US 2020/0210420 A1 Jul. 2, 2020

(51) Int. Cl.
*G06F 16/30* (2019.01)
*G06F 16/2453* (2019.01)
*G06Q 30/0251* (2023.01)

(52) U.S. Cl.
CPC ..... *G06F 16/2454* (2019.01); *G06Q 30/0254* (2013.01)

(58) Field of Classification Search
CPC .................................................. G06F 16/2454
See application file for complete search history.

(56) References Cited

U.S. PATENT DOCUMENTS

| | | | | |
|---|---|---|---|---|
| 6,564,218 B1* | 5/2003 | Roth | ............... | G06F 16/9574 707/999.009 |
| 2011/0072006 A1* | 3/2011 | Yu | ............... | G06F 16/24535 707/718 |
| 2012/0221591 A1* | 8/2012 | Yemeni | ............... | G06Q 30/02 707/769 |
| 2012/0278305 A1* | 11/2012 | Wei | ............... | G06F 16/24524 707/713 |
| 2015/0347410 A1* | 12/2015 | Kim | ............... | G06F 16/2445 707/769 |
| 2016/0055156 A1* | 2/2016 | Li | ............... | G06F 16/24552 711/128 |

* cited by examiner

*Primary Examiner* — Khanh B Pham
(74) *Attorney, Agent, or Firm* — Venable LLP

(57) ABSTRACT

The present teaching relates to method, system, and programming for evaluating expressions. An expression indicative of conditions and metadata associated therewith is obtained. A determination is made as to whether the expression corresponds to a modified version of an earlier expression based on the metadata. In response to a determination that the expression is the modified version of the earlier expression, a query associated with the modified expression is transmitted to a forecasting cluster so that the modified expression is to be evaluated by the forecasting cluster. In response to a determination that the expression does not have a corresponding earlier expression, the expression is evaluated.

20 Claims, 15 Drawing Sheets

METHOD AND SYSTEM FOR EVALUATING EXPRESSIONS

BACKGROUND

1. Technical Field

The present teaching generally relates to data processing. More specifically, the present teaching relates to techniques of processing and evaluating expressions that query large data sets.

2. Technical Background

In the age of the Internet, amount of data available becomes explosive. Great effort has been made to analyze the vast amount of data to make some sense out of it in order to improve the efficiency associated with data access. Retrieval of large indexed data has always been a subject of research as datasets grow in size and complexity.

More concretely, expressions (e.g., Boolean expressions) that query large datasets and require frequent operations such as intersections and unions to be performed on the datasets can turn out to be costly depending on the number, type, and location of data points, which are part of a larger dataset. For example, in online advertising, Boolean expressions can refer to combinations of targeting elements for a given advertising campaign e.g., demographics, technographics, ad positions, site blacklists and whitelists, etc. In such scenarios, the expressions can grow at a scale that increases their evaluation response times to unacceptable levels.

Accordingly, there is a requirement for efficiently managing and processing expressions that query large datasets.

SUMMARY

The teachings disclosed herein relate to methods, systems, and programming for data processing. More specifically, the present teaching relates to methods, systems, and programming for processing and evaluating expressions that query large data sets.

One aspect of the present disclosure provides for a method, implemented on a machine having at least one processor, storage, and a communication platform capable of connecting to a network for evaluating expressions. The method includes obtaining an expression indicative of conditions and metadata associated therewith and determining whether the expression corresponds to a modified version of an earlier expression based on the metadata. In response to a determination that the expression is the modified version of the earlier expression, a query associated with the modified expression is transmitted to a forecasting cluster so that the modified expression is to be evaluated by the forecasting cluster. In response to a determination that the expression does not have a corresponding earlier expression, the expression is evaluated.

By one aspect of the present disclosure, there is provided a system for evaluating expressions. The system includes a modification detector configured for obtaining an expression indicative of conditions and metadata associated therewith and determining whether the expression corresponds to a modified version of an earlier expression based on the metadata. The system includes an expression updater configured for transmitting, in response to a determination that the expression is the modified version of the earlier expression, a query associated with the modified expression to a forecasting cluster so that the modified expression is to be evaluated by the forecasting cluster. The expression updater is also configured for evaluating the expression, in response to a determination that the expression does not have a corresponding earlier expression.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a non-transitory computer readable medium including computer executable instructions, wherein the instructions, when executed by a computer, cause the computer to perform a method for evaluating expressions. The method includes obtaining an expression indicative of conditions and metadata associated therewith and determining whether the expression corresponds to a modified version of an earlier expression based on the metadata. In response to a determination that the expression is the modified version of the earlier expression, a query associated with the modified expression is transmitted to a forecasting cluster so that the modified expression is to be evaluated by the forecasting cluster. In response to a determination that the expression does not have a corresponding earlier expression, the expression is evaluated.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
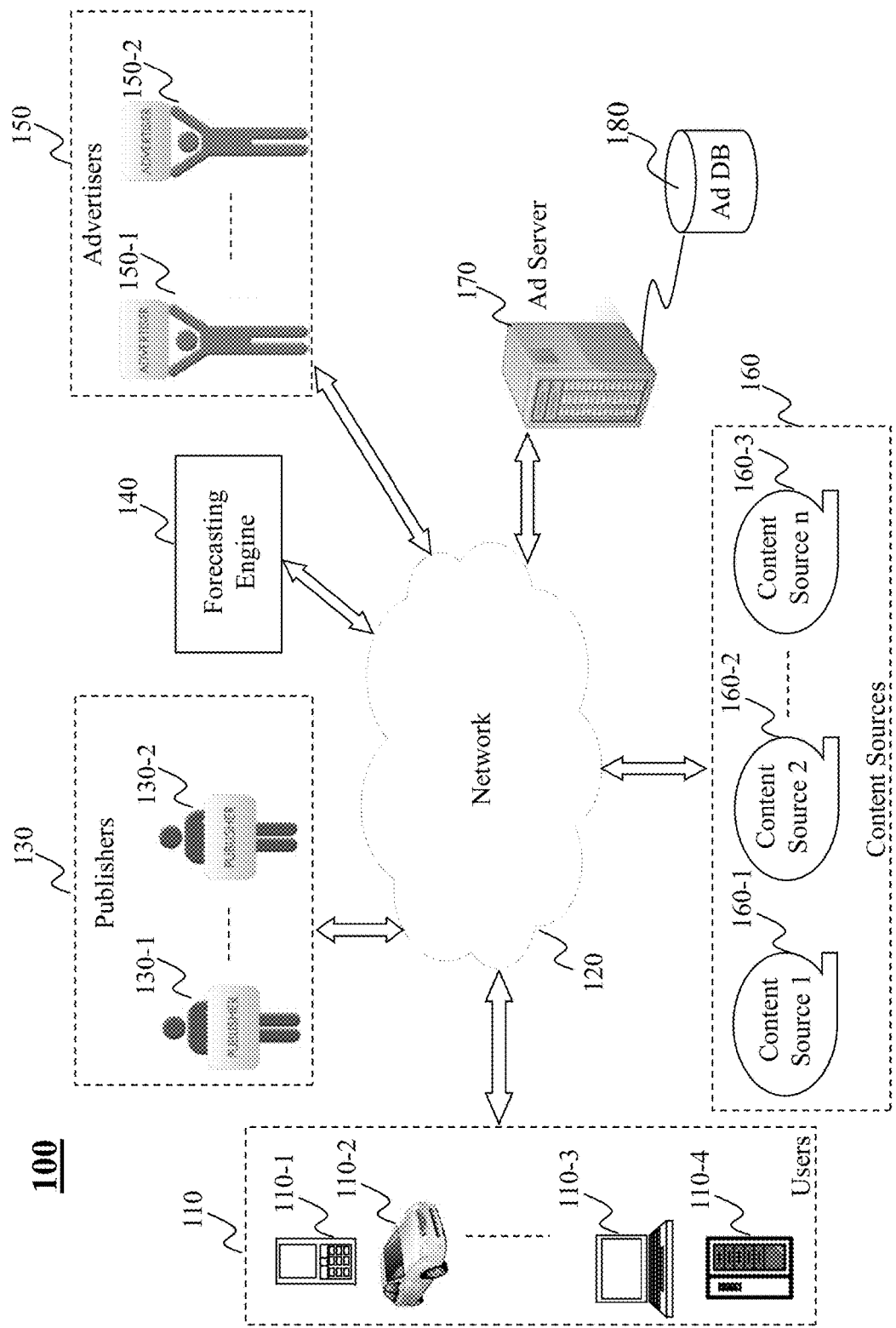
FIG. 1 is a high-level depiction of an exemplary networked environment in which a forecasting engine operates as an independent service on a network, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In online advertising, a forecasting system typically stores advertising events in bit-sets (i.e., an array of variables e.g., Boolean variables). A bit-set is computed for each attribute that the forecasting system performs a forecast on. Each bit in the bit-set may represent an advertising event, which can be a bid or an impression. Each bit may be turned on or off depending on whether or not a certain advertising attribute, such as a demographic segment or a publisher's site, corresponds to such an event. In order to determine the cardinality for certain advertising criteria, a cluster of nodes (referred to herein after as 'worker nodes') loads such bit-sets for a given day and perform a Boolean operation across every bit-set on all available data partitions.

By one embodiment, the advertising criteria may be represented by a set of expressions, e.g., Boolean expressions. Thus, the cluster of worker nodes loads the bit-sets and evaluates the expressions with respect to the bit-sets to perform a forecast. It must be appreciated that the expressions may recursively nest multiple sub-expressions. Thus, if all the expressions were transmitted from an application interface of the forecasting system to the worker nodes, the transmitted data could contain tens of thousands of elements, which in turn and can increase the latency between the application interface and the worker node communications to an unacceptable threshold. Accordingly, in what follows, there is provided a detailed description of exemplary embodiments outlining a forecasting engine that addresses the above stated issues and manages the processing and evaluation of expressions that query large data sets in an efficient manner.

FIG. 1 is a high-level depiction of an exemplary networked environment in which a forecasting engine operates as an independent service on a network, according to an embodiment of the present teaching. The exemplary networked environment 100 includes users 110, a network 120, publishers 130, a forecasting engine 140, advertisers 150, content sources 160, an ad server 170, and an ad database 180. The network 120 in networked environment 100 may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof. In one embodiment, the network 120 may be an online advertising network or an ad network, which connects advertisers 150 to publishers 130 or websites/mobile applications that want to host advertisements. A key function of an ad network is aggregation of ad-space supply from publishers and matching it with advertiser demand. An ad network may be a television ad network, a print ad network, an online (Internet) ad network, or a mobile ad network.

Users 110 may be of different types such as users connected to the network via desktop connections (110-4), users connecting to the network via wireless connections such as through a laptop (110-3), a handheld mobile device (110-1), or a built-in device in a motor vehicle (110-2). In one embodiment, user(s) 110 may be connected to the network and able to access and interact with online content (provided by the publishers) through wireless technologies and related operating systems implemented within user-wearable devices (e.g., glasses, wrist watch, etc.). A user, e.g., the user 110-1, may send a request for online content to one of the publishers, e.g., 130-1, via the network 120 and receive content through the network 120.

Publishers 130 may correspond to an entity, whether an individual, a firm, or an organization, having publishing business, such as a television station, a newspaper issuer, a web page host, an online service provider, or a game server. For example, in connection to an online or mobile ad network, publishers 130-1 . . . 130-2 can be an organization such as USPTO.gov, a content provider such as CNN.com and Yahoo.com, or a content-feed source such as tweeter or blogs. In one embodiment, publishers 130 include entities that develop, support and/or provide online content via mobile applications (e.g., installed on smartphones, tablet devices, etc.).

Referring to the above example, the content sent to user 110-1 may be generated by the publisher 130-1 based on the content sources 160. A content source may correspond to an entity where the content was originally generated and/or stored. For example, a novel may be originally printed in a magazine, but then posted online at a web site controlled by a publisher. The content sources 160 in the exemplary networked environment 100 include multiple content sources 160-1, 160-2 . . . 160-3.

An advertiser, e.g. 150-1, may correspond to an entity, whether an individual, a firm, or an organization, doing or planning to do (or otherwise involved in) advertising business. As such, an advertiser 150-1 may be an entity that provides product(s) and/or service(s), and itself handles the advertising process for its own product(s) and/or service(s) at a platform (e.g., websites, mobile applications, etc.) provided by a publisher. For example, advertisers 150-1 . . . 150-2 may include companies like General Motors, Best Buy, or Disney. In some other cases, however, an advertiser 150-1 may be an entity that only handles the advertising process for product(s) and/or service(s) provided by another entity.

When content is sent to the user 110-1, one or more advertising opportunities may be available for one or more advertisements to be presented with the content to the user 110-1, on a same web page, via a same application, or in a same user session. For an available advertising opportunity, a request may be sent out to advertisers to solicit bids with respect to the advertising opportunity. The request can be sent out by an ad server 170 that manages the publisher 130-1. The ad server here serves as a supply side platform (SSP) for selling one or more advertisement opportunities by soliciting bids from one or more demand side platforms (DSP) and selecting a winning bid among the bids received from the DSPs. The bid request may be sent out to one or more DSPs.

Advertisers 150 typically target the most receptive audiences with certain traits, based on the product or person the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity. Targeted advertising is focused on certain traits and the consumers who are likely to have a strong preference will receive the message instead of those who have no interest and whose preferences do not match a product's attribute. As such, the advertisers 150 can serve advertisements stored in an ad database 180 to the most relevant audience.

By one embodiment, the targeting criteria of the advertisers 150 may be transmitted to the forecasting engine 140. The forecasting engine 140 in turn, generates expressions (e.g., Boolean expressions) which are evaluated with respect to event data to generate accurate forecasts for the advertisers. As such, the advertisers 150 can target audiences based on the forecasts provided by the forecasting engine 140, and in turn maximize their return on investments. In what follows, there is provided a detailed description of the operations of the forecasting engine 140. It must be appreciated that although the forecasting engine 140 as described above is in the realm of an advertising setting, it is equally applicable in other application that require forecast evaluations to be performed on expressions that correspond to changeable business requirements. Additionally, it must be appreciated that the operations of the forecasting engine as described herein are applicable to any type of expressions. However, for the sake of convenience, the following detailed description is provided with respect to Boolean expressions.

Figure 2:
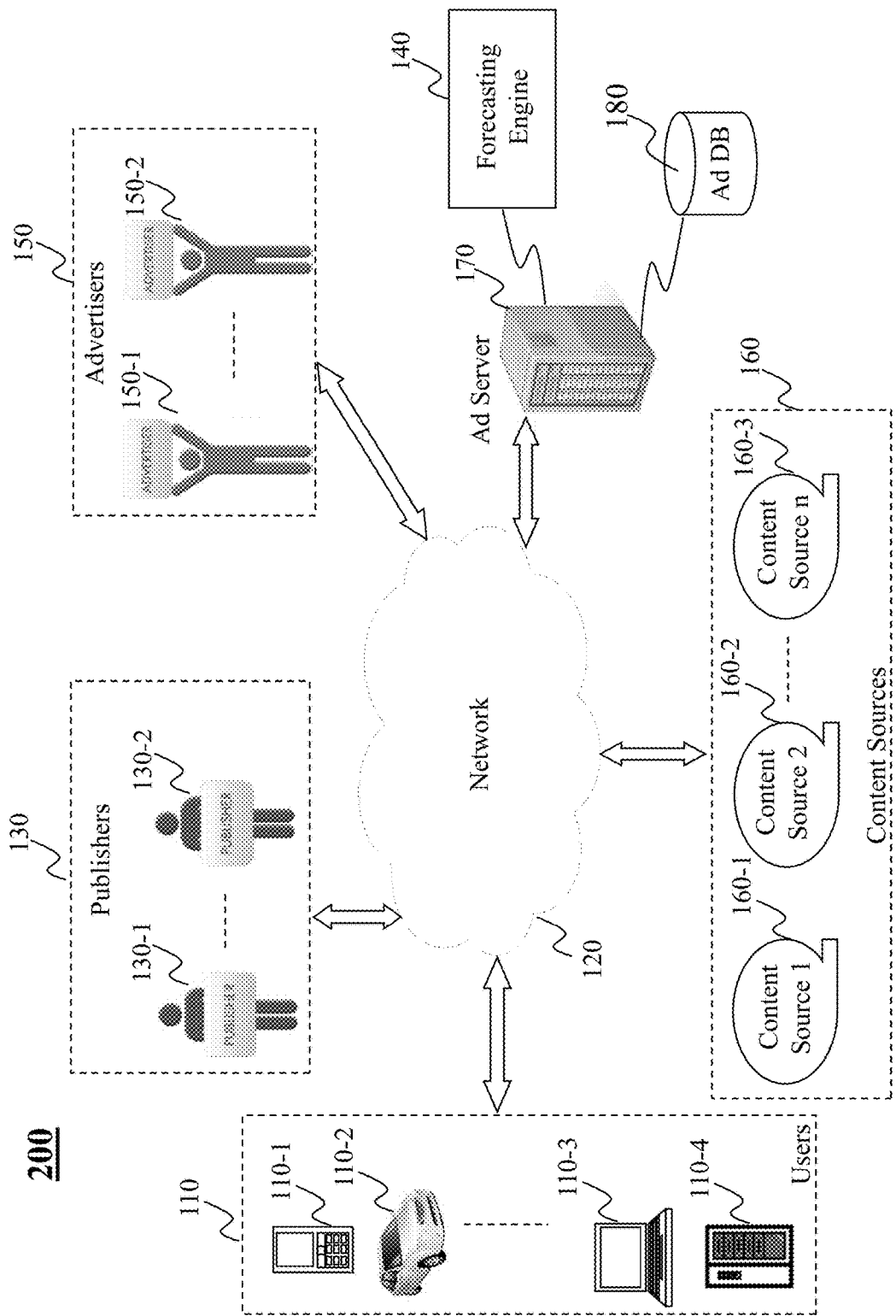
FIG. 2 is a high-level depiction of another operational configuration of a forecasting engine, according to an embodiment of the present teaching.

In FIG. 2, an alternative configuration 200 of a networked environment is provided, in which a forecasting engine 140 is connected to an ad server 170 as its backend service engine. That is, in this embodiment, the forecasting engine 140 is a special module in the backend of an advertisement server 170. When there are multiple advertisement servers (not shown), each may have its own backend module for generating forecasts for various advertiser requirements.

Figure 3:
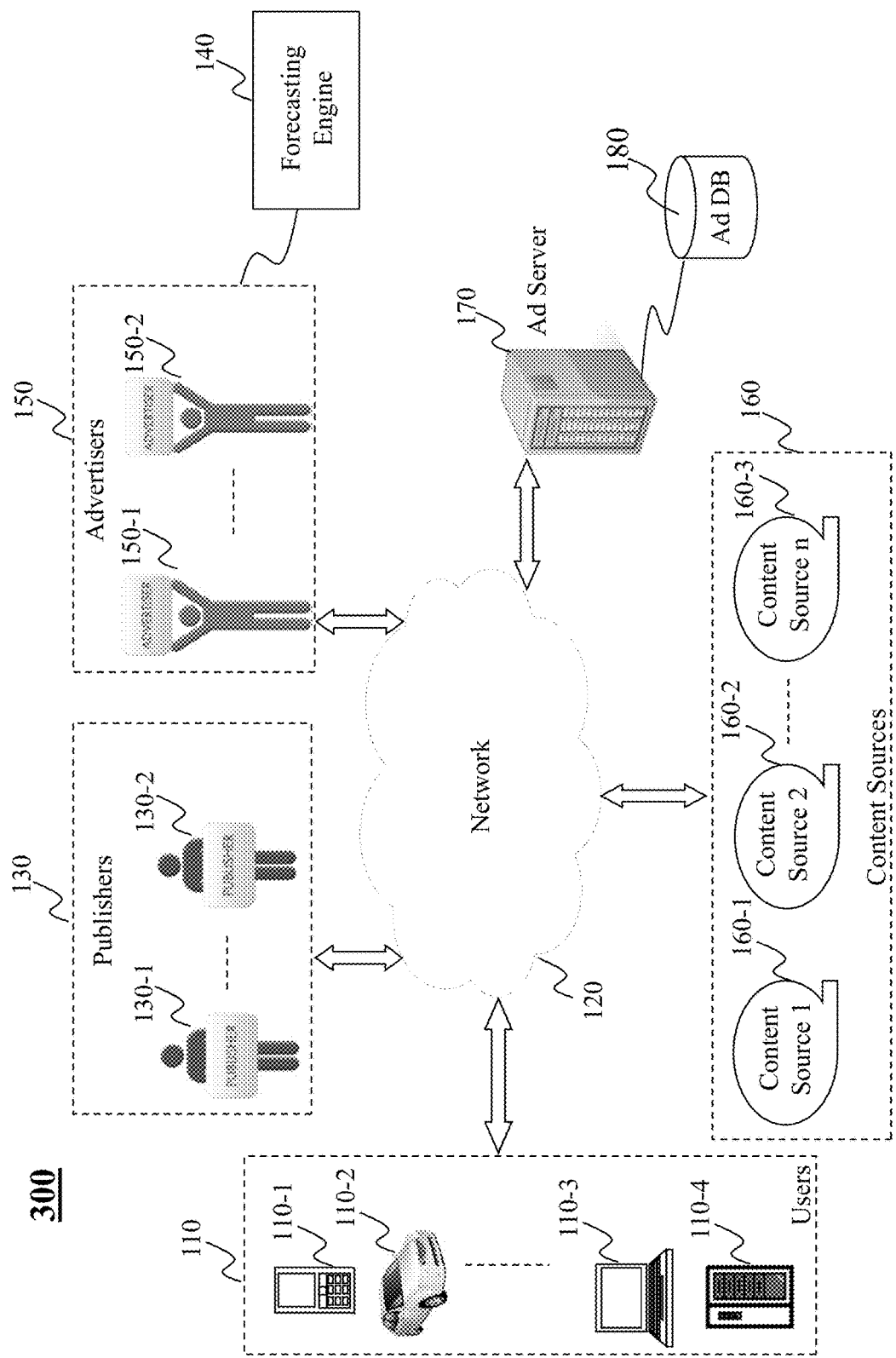
FIG. 3 is a high-level depiction of a different operational configuration of a forecasting engine, according to an embodiment of the present teaching.

In FIG. 3, an alternative configuration 300 of a networked environment is provided, in which a forecasting engine 140 is connected to an advertiser 150 as its backend service engine. That is, in this embodiment, the forecasting engine 140 is a special module in the backend of the advertiser 150. It must be appreciated that multiple advertisers may each have their own backend module (i.e., the forecasting engine) for generating forecasts on their respective advertising criteria.

Figure 4:
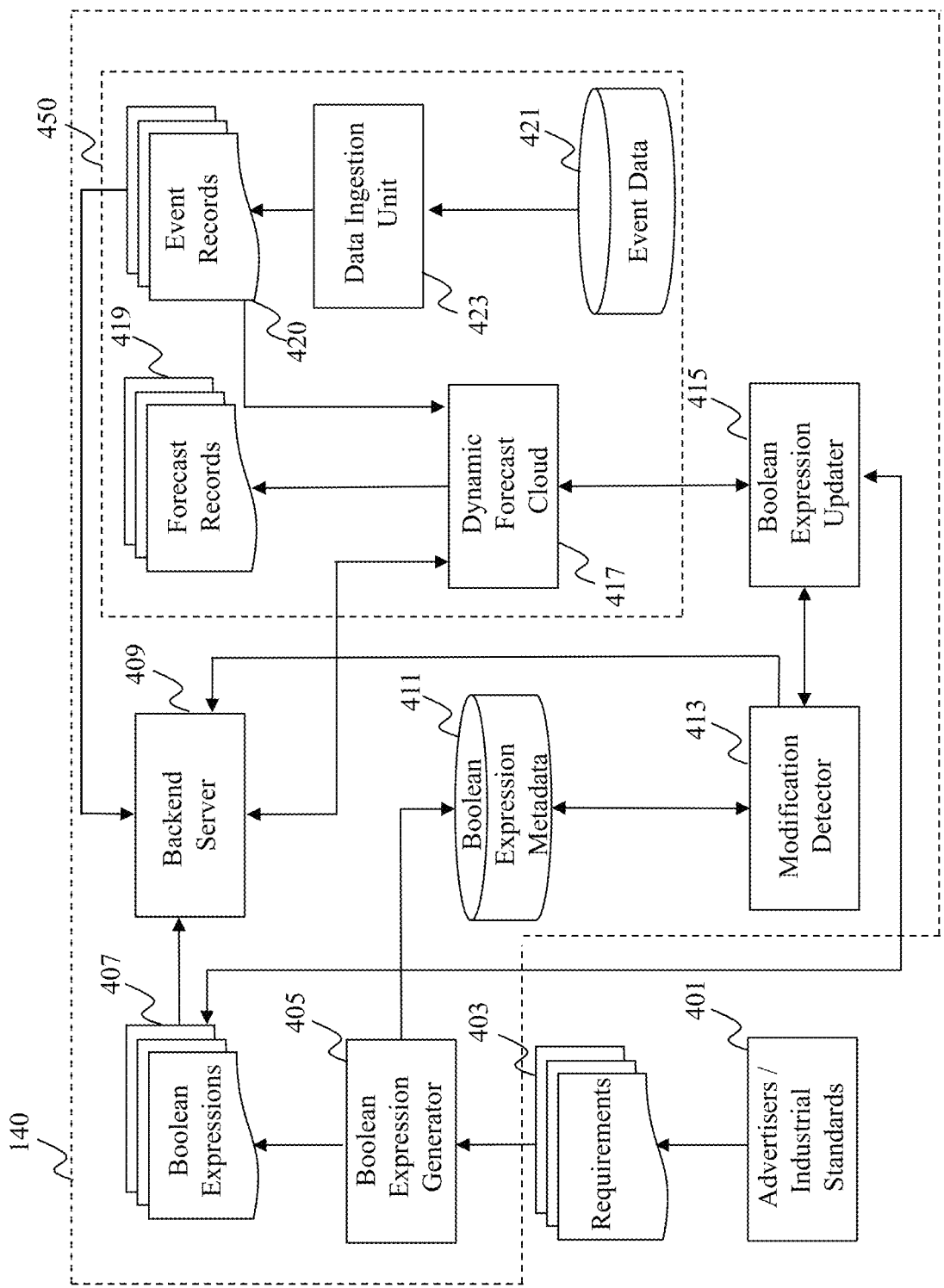
FIG. 4 depicts an exemplary system diagram of a forecasting engine, according to an embodiment of the present teaching.

Turning to FIG. 4, there is depicted an exemplary system diagram of a forecasting engine 140, according to an embodiment of the present teaching. The forecasting engine 140 includes a Boolean expression generator 405, a backend server 409, Boolean expression metadata database 411, a modification detector 413, a Boolean expression updater 415, a dynamic forecast cloud 423, a data ingestion unit 423, and an event data database 421.

Advertisers/industrial standards 401 correspond to external actors whose requirements 403 define external, changeable business rules. The Boolean expression generator 405 transforms the requirements 403 into Boolean expressions 407. The Boolean expression metadata database 411 is configured to store metadata such as update time, Boolean expression version, etc., associated with the Boolean Expressions.

According to one embodiment of the present teaching, the modification detector 413 identifies whether a new version of a previously existing Boolean expression has been created. The modification detector 413 is configured to determine the new version based on metadata associated with the new Boolean expression. Further, the modification detector 413 pushes only the modified or changed expressions through to the Boolean expression updater 415 for further processing. If the modification detector 413 determines that a Boolean expression is unmodified (e.g., the expression does not have a corresponding earlier version), then the modification detector is configured to signal the backend server 409 to process and evaluate the Boolean expression.

By one embodiment of the present teaching and as described in detail further, the Boolean expression updater 415 may receive a request from a worker node for transmitting an updated definition associated with a Boolean expression. In this case, the Boolean expression updater 415 may query the modification detector 413 to determine if an updated definition associated with the Boolean expression exists. The modification detector 413 may determine whether an updated definition exists based on the metadata associated with the Boolean expression. If an updated definition exists, the modification detector 413 may notify the Boolean expression updater 415, which thereafter may transmit the modified definition to the worker node. Details regarding the operation of the modification detector (413) are described next with reference to FIG. 6.

The Boolean expression updater 415 is configured to transmit a special query (referred to herein as a 'contracted query') to the dynamic forecast cloud 417 for processing and evaluating the modified Boolean expression. Details regarding the operation of the Boolean expression updater 415 are described next in FIG. 8.

The dynamic forecast cloud 417 comprises a cluster of worker nodes that generate forecasts records 419 upon processing the modified Boolean expression. The dynamic forecast cloud 419 utilizes event records 420 for forecasting. The event records 420 may be generated by a data ingestion unit 423 that processes raw event records such as bid requests, responses, impressions, clicks, action records, etc. The dynamic forecast cloud 417 utilizes the event records 450 to compute, for instance, the number of events that will occur in the future, subject to criteria expressed by the modified Boolean expression(s). Details regarding the operation of the dynamic forecast cloud 417 are described next with reference to FIG. 10.

According to one embodiment, the event records 420 are forwarded to the backend server 409 for processing the unmodified Boolean expressions. Furthermore, it must be appreciated that the portion labeled 450 in FIG. 4, which includes the dynamic forecast cloud 417, the data ingestion unit 423, and the event data database 421 may be a part of the forecasting engine 140 as explained above, or alternatively, according to another embodiment of the present teaching, be physically separate from the forecasting engine 140.

Figure 5:
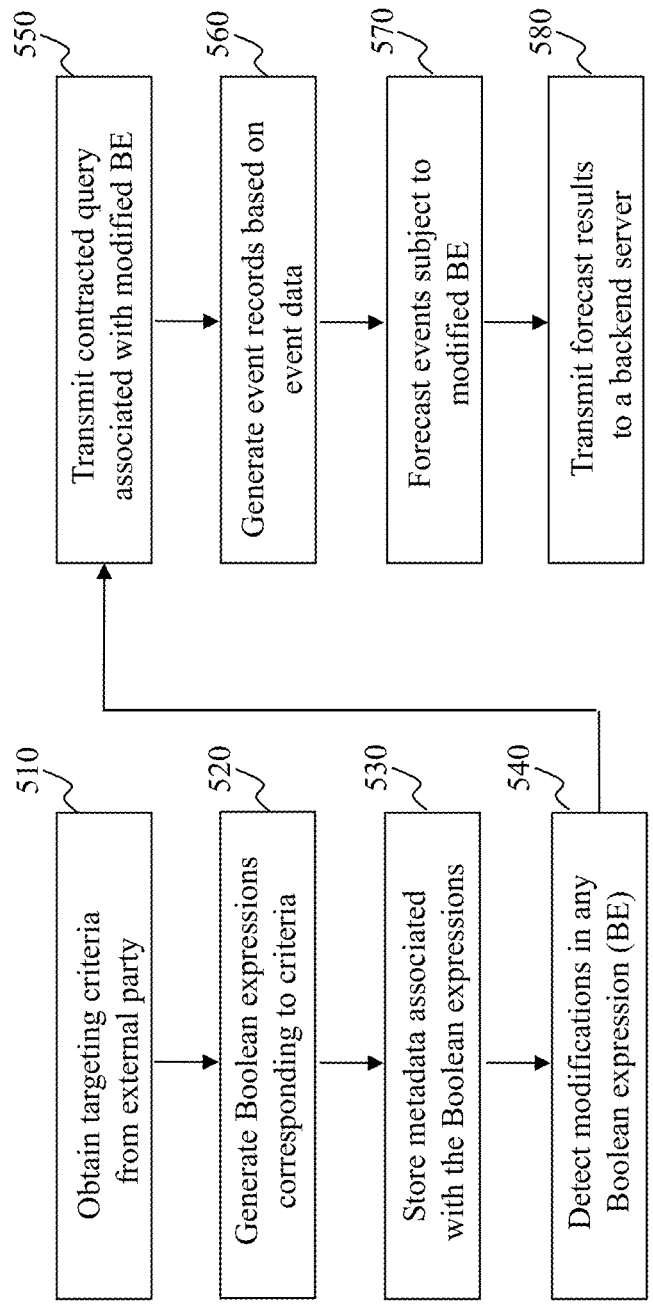
FIG. 5 is a flowchart of an exemplary process performed by a forecasting engine, according to an embodiment of the present teaching.

FIG. 5 depicts a flowchart of an exemplary process of a forecasting engine, according to an embodiment of the present teaching. The steps 510-530 pertain to the generation of Boolean expressions and associated metadata, the steps 540-550 pertain to detecting whether a Boolean expression is modified, whereas steps 560-580 pertain to perform forecasting.

The process commences in step 510, wherein targeting criteria is obtained from an external party. In step 520, Boolean expressions corresponding to the targeting criteria are generated. The metadata associated with the Boolean expressions is stored in a metadata database in step 530.

In step 540, it is determined whether any Boolean expression is a modified Boolean expression. For instance, the modification detector determines whether a Boolean expression is a modified version of a previous Boolean expression. In step 550, a special query (i.e., the contracted query) is generated and transmitted, for instance from the Boolean expression updater to the dynamic forecast cloud.

Further, in step 560, the data ingestion unit generates event records based on event data. In step 570, the dynamic forecast cloud utilizes the generated event records to evaluate the modified Boolean expression. Specifically, the dynamic forecast cloud forecasts events with respect to the modified Boolean expression based on the generated event records. In step 580, the dynamic forecast cloud transmits results of evaluating the modified Boolean expression back to the back-end server.

Figure 6:
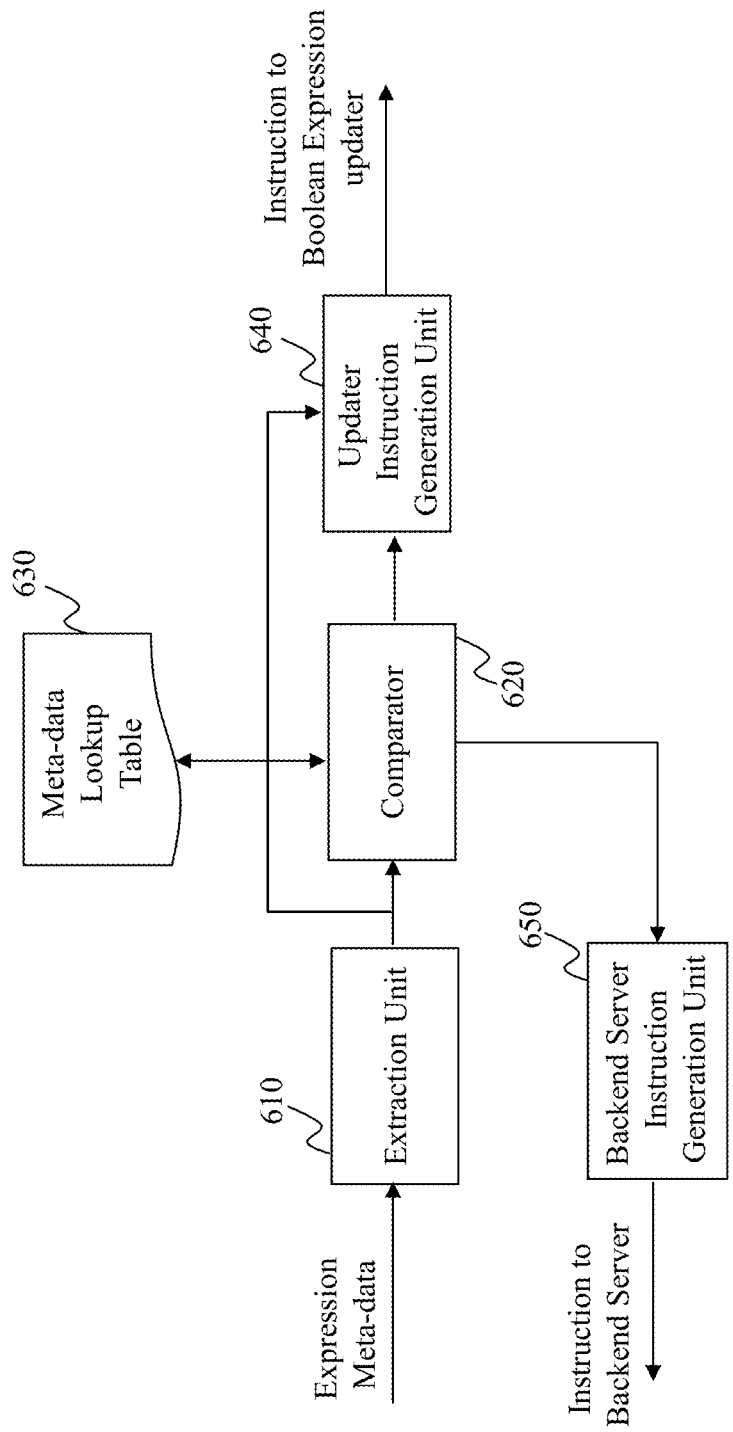
FIG. 6 depicts an exemplary high-level diagram of a modification detector, according to an embodiment of the present teaching.

FIG. 6 depicts an exemplary high-level diagram of a modification detector included in the forecasting engine, according to an embodiment of the present teaching. The modification detector 413 includes an extraction unit 610, a comparator 620, an updater instruction generation unit 640, and a backend server instruction generation unit 650.

The modification detector 413 retrieves metadata associated with a Boolean expression from the metadata database. The extraction unit 610 extracts metadata parameters from the received metadata. The extracted parameters may correspond to a timestamp associated with the Boolean expression, a version number of the Boolean expression, or the like. The comparator 620 compares the extracted metadata with information maintained in a metadata lookup table 630. For example, by one embodiment, the comparator 620 may compare the extracted version number of the Boolean expression with a previously stored version number of the Boolean expression to determine whether the Boolean expression under consideration is a modified version of an earlier existing Boolean expression. A similar comparison with respect to the timestamp parameter of the Boolean expression may be performed to determine whether the Boolean expression under consideration is a modified expression of an earlier existing expression.

In response to a determination that the Boolean expression under consideration is a modified Boolean expression of a previously existing expression, the comparator 620 triggers the updater instruction unit 640 to generate and transmit, an instruction to the Boolean expression updater of the forecasting engine. Such an instruction may include the extracted parameters from the received metadata and may indicate that the modified Boolean expression is to be processed and evaluated by the dynamic forecast cloud. In contrast, in response to a determination that the Boolean expression under consideration is not a modified version of a previously existing expression (i.e., the current Boolean expression is either a new Boolean expression or a previous Boolean expression), the comparator 620 triggers the backend server instruction generation unit 650 to generate and transmit an instruction to the backend server to process and evaluate the Boolean expression.

Figure 7:
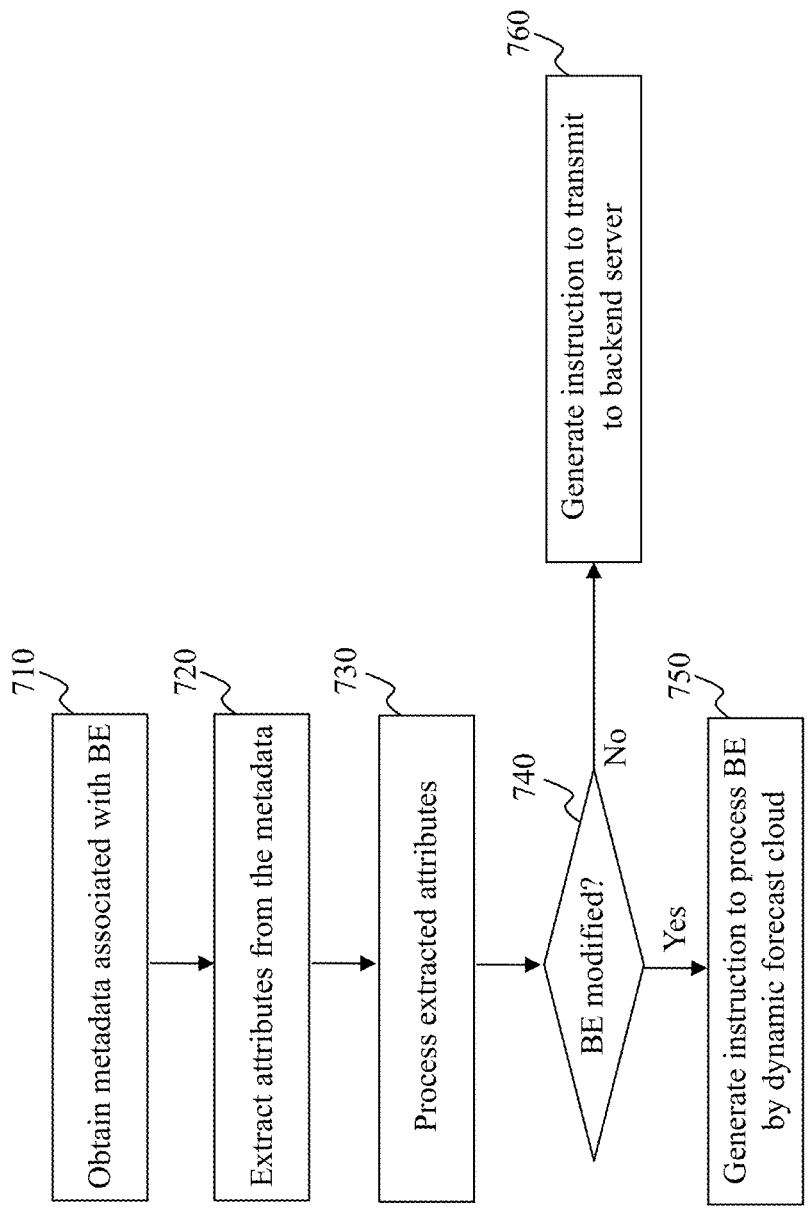
FIG. 7 is a flowchart of an exemplary process performed by a modification detector, according to an embodiment of the present teaching.

FIG. 7 is a flowchart of an exemplary process of a modification detector, according to an embodiment of the present teaching. The process commences in step 710, where metadata associated with a Boolean expression is obtained. In step 720, the modification detector extracts attributes (i.e., parameters) from the obtained metadata. Further, the process moves to step 730 wherein the modification detector processes the extracted parameters determine whether the Boolean expression is modified. In step 740, a query is initiated to determine whether the Boolean expression is a modified version of a previously existing Boolean expression. If the response to the query is affirmative, the process moves to step 750, else is the response to the query is negative, the process moves to step 760. In step 750, the modification detector generates an instruction indicative that the modified Boolean expression is to be processed by the dynamic forecast cloud, whereas in step 760, the modification detector generates an instruction indicative that the Boolean expression (i.e., unmodified expression) is to be processed by the backend server.

Figure 8:
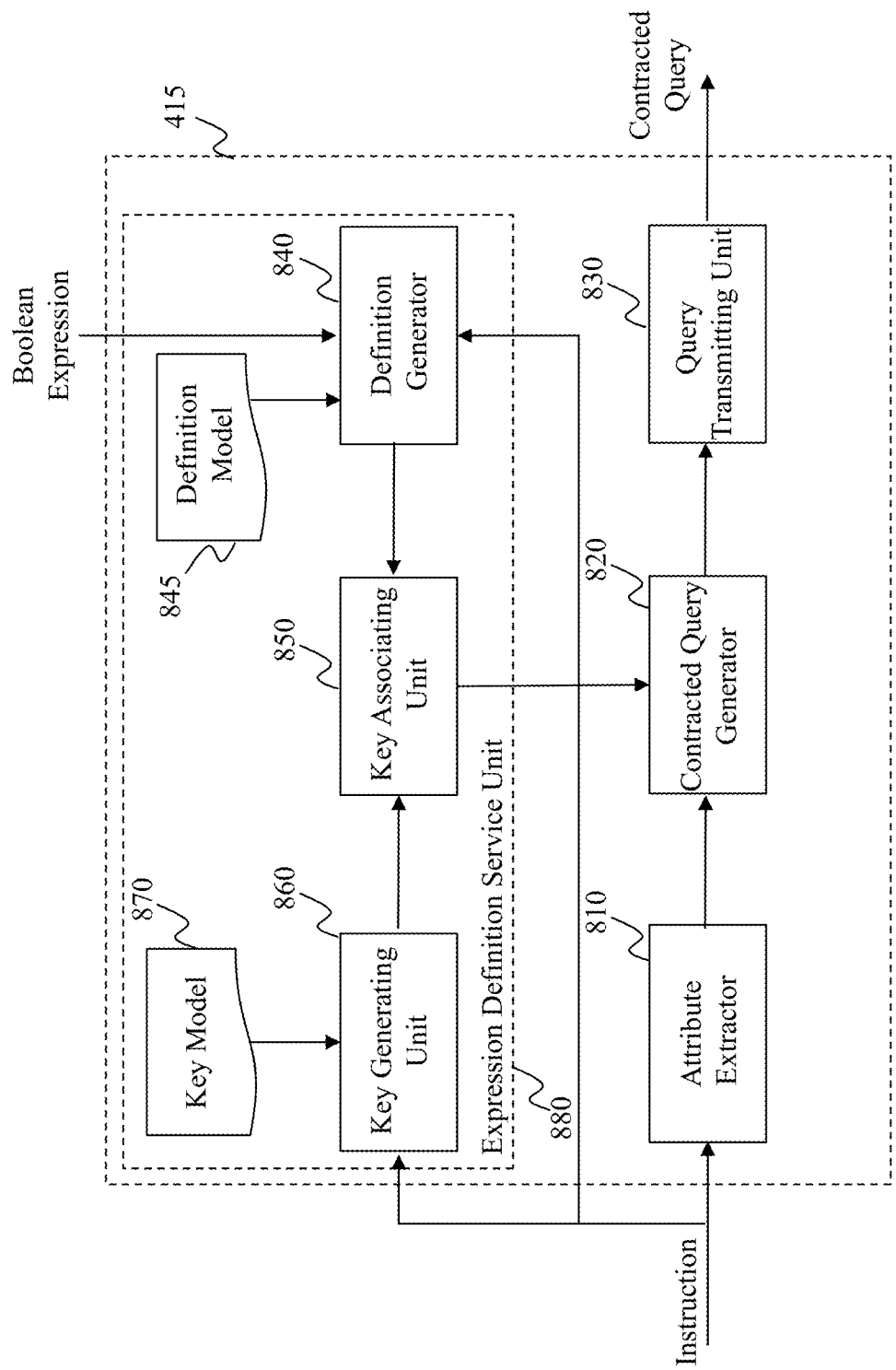
FIG. 8 depicts an exemplary high-level diagram of a Boolean expression updater, according to an embodiment of the present teaching.

FIG. 8 depicts an exemplary high-level diagram of a Boolean expression updater 415, according to an embodiment of the present teaching. The Boolean expression updater 415 is configured to receive an instruction corresponding to the modified Boolean expression from the modification detector 413, and thereafter generate and transmit a special query (i.e., the contracted query) to the dynamic forecast cloud 417 for processing and evaluating the modified Boolean expression. The Boolean expression updater 415 includes an attribute extractor 810, a contracted query generator 820, a query transmitting unit 830, and an expression definition service unit 880. The expression definition service unit 880 includes a definition generator 840, a key associating unit 850, and a key generating unit 860.

Upon receiving an instruction from the modification detector 413, the attribute extractor 810 extracts an attribute included in the instruction (e.g., timestamp attribute). By one embodiment of the present teaching, the timestamp is used by the contracted query generator 820 to generate the contracted query. The received instruction also triggers the key generating unit 860 and the definition generator 840 included in the expression definition service unit 880. The key generating unit 860 generates a key that is to be included in the contracted query in accordance with a key model 870. The definition generator 840 obtains the modified Boolean expression and generates a definition corresponding to the expression in accordance with a definition model 845. The generated key and definition are respectively sent to the key associating unit 850.

By one embodiment of the present teaching, the key associating unit 850 transmits the generated key-definition pair to the contracted query generator 820. The contracted query generator 820 assembles the pair (i.e., the key & definition) and the attribute (e.g., timestamp) extracted from the received instruction to form the contracted query associated with the modified Boolean expression. The contracted query is further sent to the query transmitting unit 830, which transmits the contracted query to the dynamic forecast cloud (417).

According to one embodiment of the present teaching, in instances wherein the definition generator portion of the expression definition services 880 is unavailable, the Boolean expression updater 415 is configured to include only the key and the extracted attribute (i.e., timestamp) in the contracted query. By one embodiment, in the case the timestamp attribute is not included in the contracted query, the Boolean expression updater 415 is configured to assign a default value of −1 to the timestamp attribute in the contracted query. In such an instance, a worker node (included in the dynamic forecast cloud) upon receiving the contracted query may extract a stale definition of the Boolean expression from its in-memory cache based on the key to process the expression. Details regarding the handling of contracted queries by the worker node are described later with reference to FIGS. 10 and 12.

Figure 9:
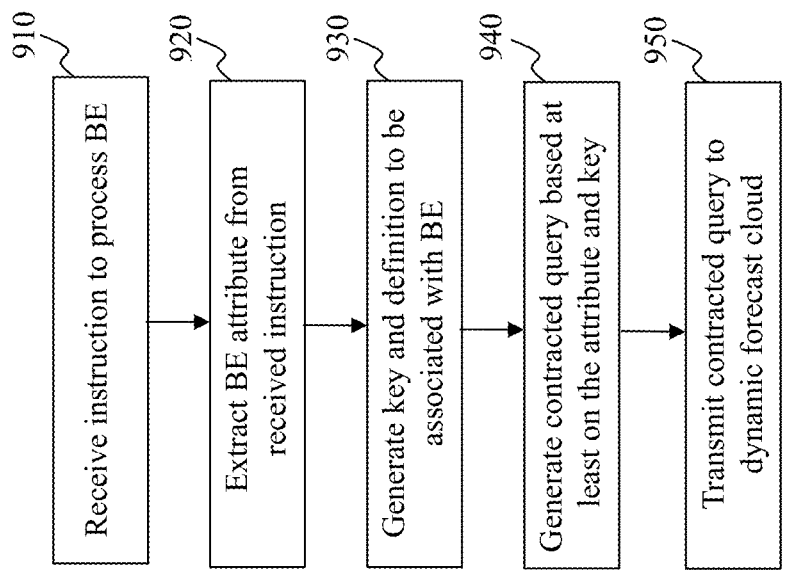
FIG. 9 is a flowchart of an exemplary process performed by a Boolean expression updater, according to an embodiment of the present teaching.

FIG. 9 is a flowchart of an exemplary process performed by the Boolean expression updater 415, according to an embodiment of the present teaching. The process commences in step 910, wherein the Boolean expression updater receives (from the modification detector) an instruction to process the modified Boolean expression.

In step 920, the Boolean expression updater extracts an attribute (e.g., timestamp parameter) from the received instruction. The process further moves to step 930, wherein the Boolean expression updater generates a key that is to be associated with the modified Boolean expression in accordance with a model. Additionally, upon the definition generation service (included in the expression definition services unit of the Boolean expression updater) being available, a definition to be associated with the modified Boolean expression is generated in accordance with a definition model.

In step 940, the Boolean expression updater generates a contracted query including at least the generated key and the extracted attribute. It must be appreciated that if the definition associated with the modified Boolean expression is available, the definition is also included in the contracted query. Further, in step 950, the Boolean expression updater transmits the contracted query for processing the modified Boolean expression to the dynamic forecast cloud.

Figure 10:
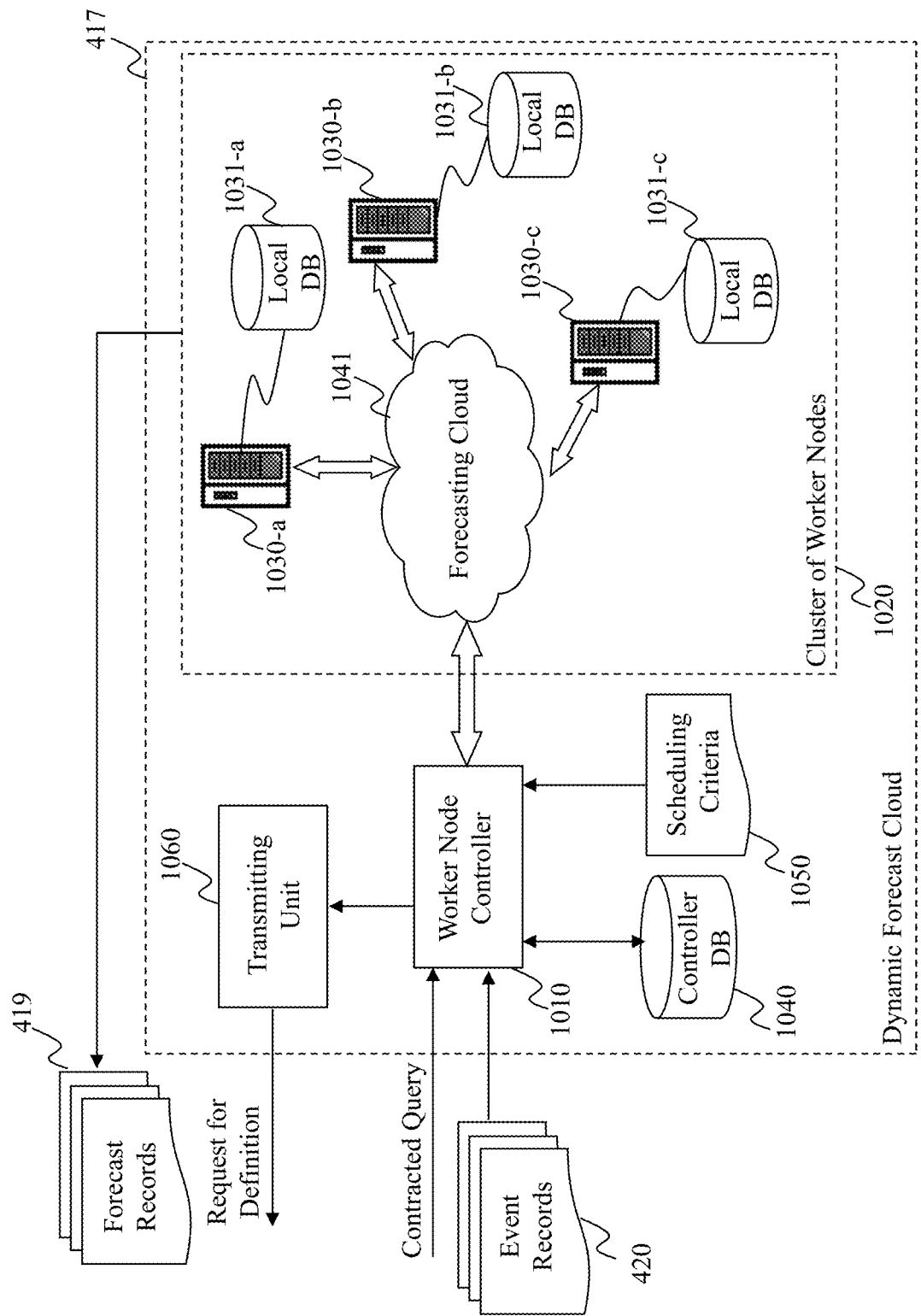
FIG. 10 depicts an exemplary high-level diagram of a dynamic forecast cloud, according to an embodiment of the present teaching.

Turning now to FIG. 10, there is depicted an exemplary high-level diagram of a dynamic forecast cloud 417, according to an embodiment of the present teaching. The dynamic forecast cloud 417 includes a worker node controller 1010, a cluster of worker nodes 1020, a controller database 1040, and a transmitting unit 1060. The cluster of worker nodes 1020 includes a plurality of worker nodes 1030-a, 1030-b . . . 1030-c that communicate with the worker node controller 1010 via a forecasting cloud network 1041. The forecasting cloud network 1041 may be a single network or a combination of different networks. For example, the network 1041 may be a local area network (LAN), a wide area network (WAN), a public network, a private network, a proprietary network, a Public Telephone Switched Network (PSTN), the Internet, a wireless network, or a virtual network, or any combination thereof. Each of the worker nodes 1030-a, 1030-b . . . 1030-c is associated with a local database or an in-memory cache represented as 1031-a, 1031-b, . . . 1031-c, respectively.

The worker node controller 1010 receives the contracted query transmitted by the Boolean expression updater 415. Upon receiving the contracted query, the worker node controller 1010 utilizes a scheduling/prioritization criterion 1050 to schedule the processing of the contracted query (corresponding to the modified Boolean expression) to at least one of the worker nodes. The scheduling/prioritization criterion may correspond to scheduling the processing of the contracted query to the worker node with the least processing load. The worker node controller 1010 maintains the respective processing loads (and other information such as cluster metadata relevant to the worker nodes) of each worker node 1030 in a controller database 1040.

According to one embodiment of the present teaching, event records 420 may be transmitted by the worker node controller 1010 to all the worker nodes 1030-a, 1030-b . . . 1030-c included in the cluster of worker nodes 1020. Alternatively, the event records 420 may be directly accessible by each of the worker nodes 1030-a, 1030-b . . . 1030-c. The worker nodes 1030-a, 1030-b . . . 1030-c utilize the event records 420 and process the contracted query to generate the forecast records 419. Details regarding the processing of the contracted query by a worker node is described next with reference to FIG. 12.

According to one embodiment of the present teaching, the dynamic forecast cloud 417 utilizes the transmitting unit 1060 to transmit a request issued by any one of the worker nodes 1030-*a*, 1030-*b* . . . 1030-*c*. For instance, consider the event when a worker node e.g., 1030-*a* is processing a contracted query, wherein the contracted query does not include a definition of the modified Boolean expression. In this case, the worker node 1030-*a* may transmit an asynchronous request to the worker node controller 1010 in order to retrieve the definition of the modified Boolean expression. The asynchronous request is transmitted via the transmitting unit 1060 by the worker node controller 1010 to the Boolean expression updater 415 to retrieve the definition.

By one embodiment of the present teaching, the worker node controller 1010 may also be configured to broadcast a definition of a modified Boolean expression to all the worker nodes 1030-*a*, 1030-*b* . . . 1030-*c* so that they can maintain the new definition in their respective in-memory caches. Alternatively, the worker node controller 1010 may transmit a special query instructing all the worker nodes 1030-*a*, 1030-*b* . . . 1030-*c* to update a definition of a modified Boolean expression (e.g., to its latest version) by retrieving the latest definition from a distributed cache and storing the latest definition in their in-memory caches respectively. Accordingly, upon receiving a scheduled contracted query, the worker nodes 1030-*a*, 1030-*b* . . . 1030-*c* may process the contracted query to build a full Boolean expression based on the definition and evaluate the modified Boolean expression with respect to event records 420 to generate forecast records 419. The generated forecast records 419 may be transmitted back to the backend server 409 included in the forecasting engine 140.

Figure 11:
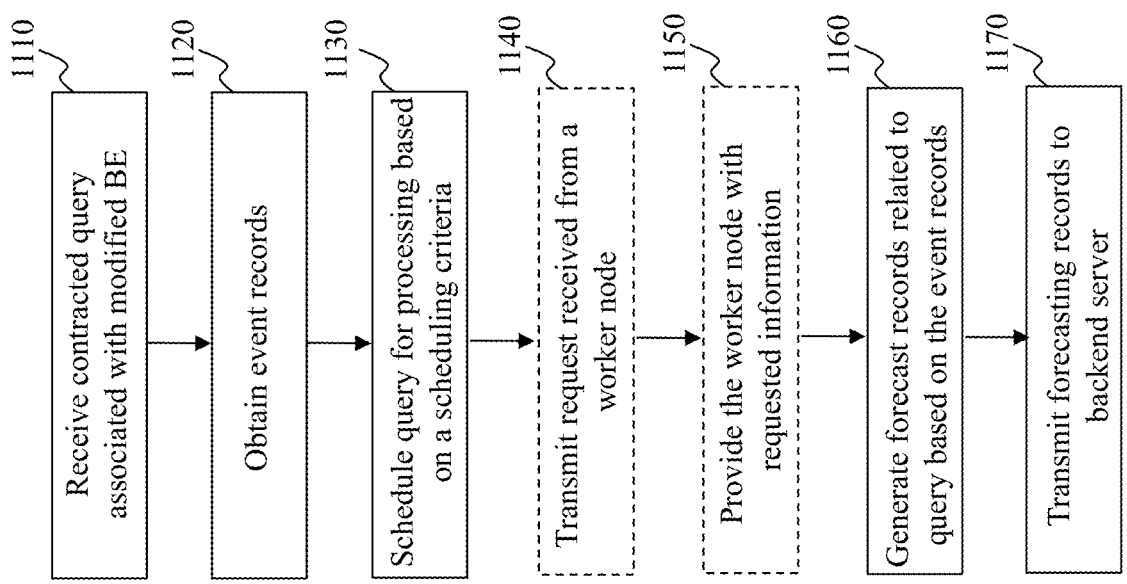
FIG. 11 is a flowchart of an exemplary process performed by a dynamic forecast cloud, according to an embodiment of the present teaching.

FIG. 11 is a flowchart of an exemplary process performed by a dynamic forecast cloud, according to an embodiment of the present teaching. The process commences in step 1110, wherein the worker node controller receives a contracted query associated with a modified Boolean expression for processing.

In step 1120, event records are obtained by the dynamic forecast cloud. As described before, the event records may be obtained by the worker node controller and further broadcasted to all the worker nodes, or alternatively, each of the worker nodes may directly access the event records. Further, in step 1130, the worker node controller schedules the contracted query for processing to at least one worker node based on scheduling/prioritization criteria.

The process then moves to step 1140, wherein based on receiving the asynchronous request from any worker node, the worker node controller transmits the request to the Boolean expression updater. Note that such a request is issued by the worker node in order to request the updated definition associated with the Boolean expression. In step 1150, the worker node controller may retrieve the updated definition (from the Boolean expression updater) and provide the updated definition to the worker nodes. Alternatively, as stated before, the worker node controller may transmit a special broadcast query to all worker nodes instructing them to retrieve the latest definition associated with a Boolean expression from a distributed cache and store the retrieved definition in their in-memory caches respectively.

In step 1160, the worker nodes evaluate the contracted query and process the modified Boolean expression based on event records to generate forecast records. Further, in step 1170, the worker nodes transmit the forecast records to the backend server included in the forecasting engine.

Figure 12:
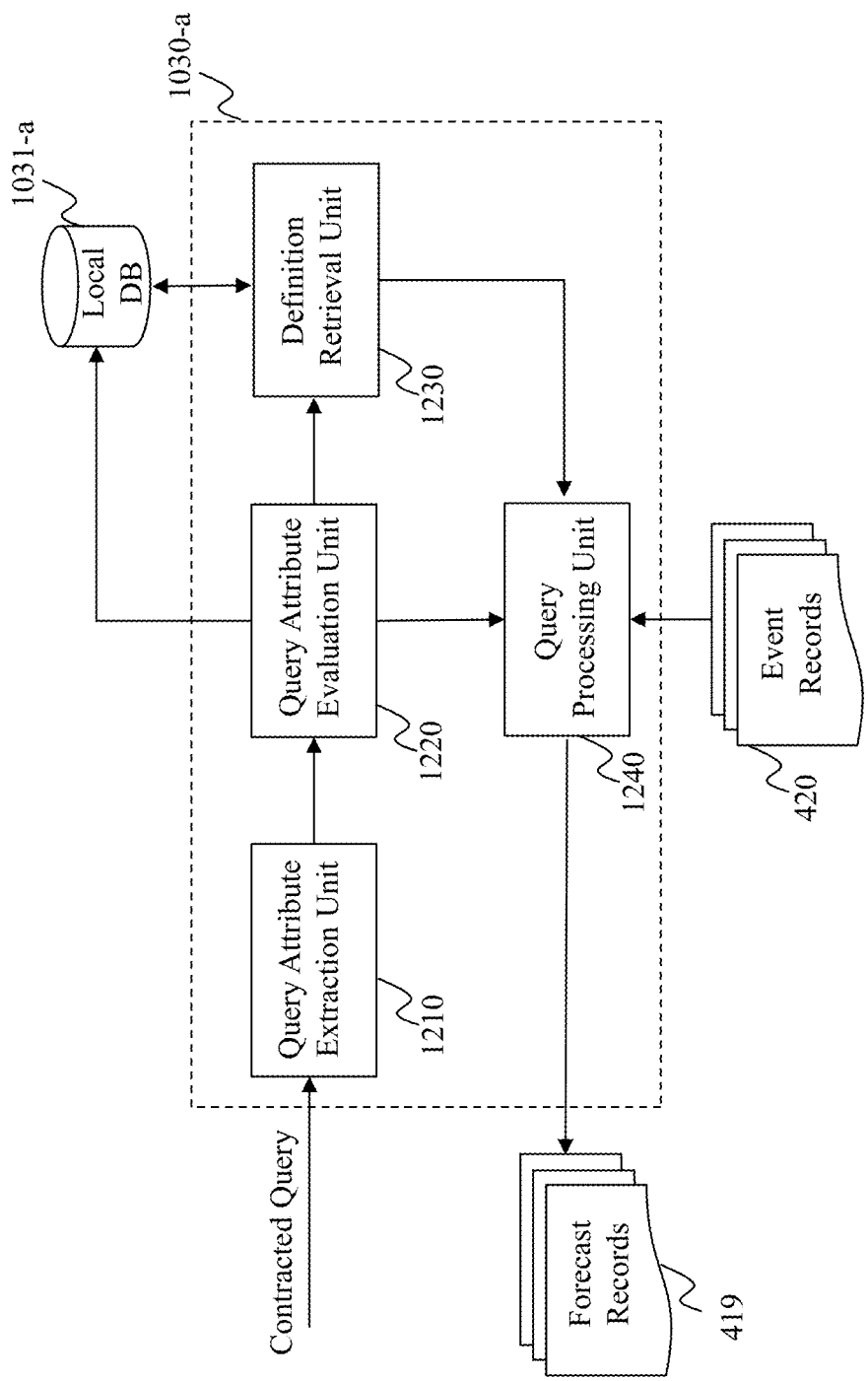
FIG. 12 depicts an exemplary high-level diagram of a worker node, according to an embodiment of the present teaching.

FIG. 12 depicts an exemplary high-level diagram of a worker node included in the dynamic forecast cloud, according to an embodiment of the present teaching. FIG. 12 depicts a worker node 1030-*a* including a query attribute extraction unit 1210, a query attribute evaluation unit 1220, a definition retrieval unit 1230, and a query processing unit 1240.

Upon receiving the contracted query, the query attribute extraction unit 1210 extracts attributes included in the contracted query. The extracted attributes are sent to the query attribute evaluation unit 1220. By one embodiment of the present teaching, if the contracted query includes a definition of the modified Boolean expression, then the query attribute unit forwards the definition to the query processing unit 1240. In this case, the query processing unit 1240 builds a full Boolean expression based on the definition and evaluates the modified Boolean expression with respect to event records 420 to generate forecast records 419.

By one embodiment of the present teaching, the contracted query may include a timestamp attribute and a key. Specifically, in this instance, the contracted query may not include a definition of the modified Boolean expression. Accordingly, the query attribute evaluation unit 1220 extracts the key and forwards it to the definition retrieval unit 1230. The definition retrieval unit 1230 uses the extracted key to perform a lookup in the local database 1031-*a* of the worker node (e.g., an in-memory cache) to determine whether a definition associated with the key is stored in the database. If the definition is stored in the database, the definition retrieval unit 1230 extracts the definition and forwards it to the query processing unit 1240. As stated above, the query processing unit builds a full Boolean expression based on the definition and evaluates the modified Boolean expression with respect to event records 420 to generate forecast records 419. However, if the definition is not stored in the database, the worker node may issue an asynchronous request to the worker node controller, requesting an updated definition of the Boolean expression.

According to one embodiment of the present teaching, upon extracting the attributes from the contracted query, it may be determined that the contracted query does not include a definition and that the timestamp parameter is assigned a default value (e.g., a default value of −1). In this case, the definition retrieval unit 1230 proceeds to retrieve the definition from the local database based on the key. It must be appreciated that the retrieved definition may be a stale definition (i.e., the definition does not correspond to the latest modification of the Boolean expression). Nevertheless, the stale definition is retrieved from the local database 1031-*a* and processed by the query processing unit 1240 in a manner as described above. Additionally, the worker node 1030-*a* may transmit an asynchronous request to the worker node controller, requesting an updated definition of the Boolean expression. As stated previously, the worker node controller may instruct (e.g., via a broadcast message) the worker node to retrieve the updated definition from a distributed cache and store the retrieved definition in its local database 1031-*a*. Moreover, it must be appreciated that in the above described embodiments, the query processing unit 1240 incorporates caching. Specifically, the query processing unit 1240 upon processing the contracted query (i.e., evaluating the modified Boolean expression) may store the processed expression and its corresponding results in the local database 1031-*a*.

Figure 13:
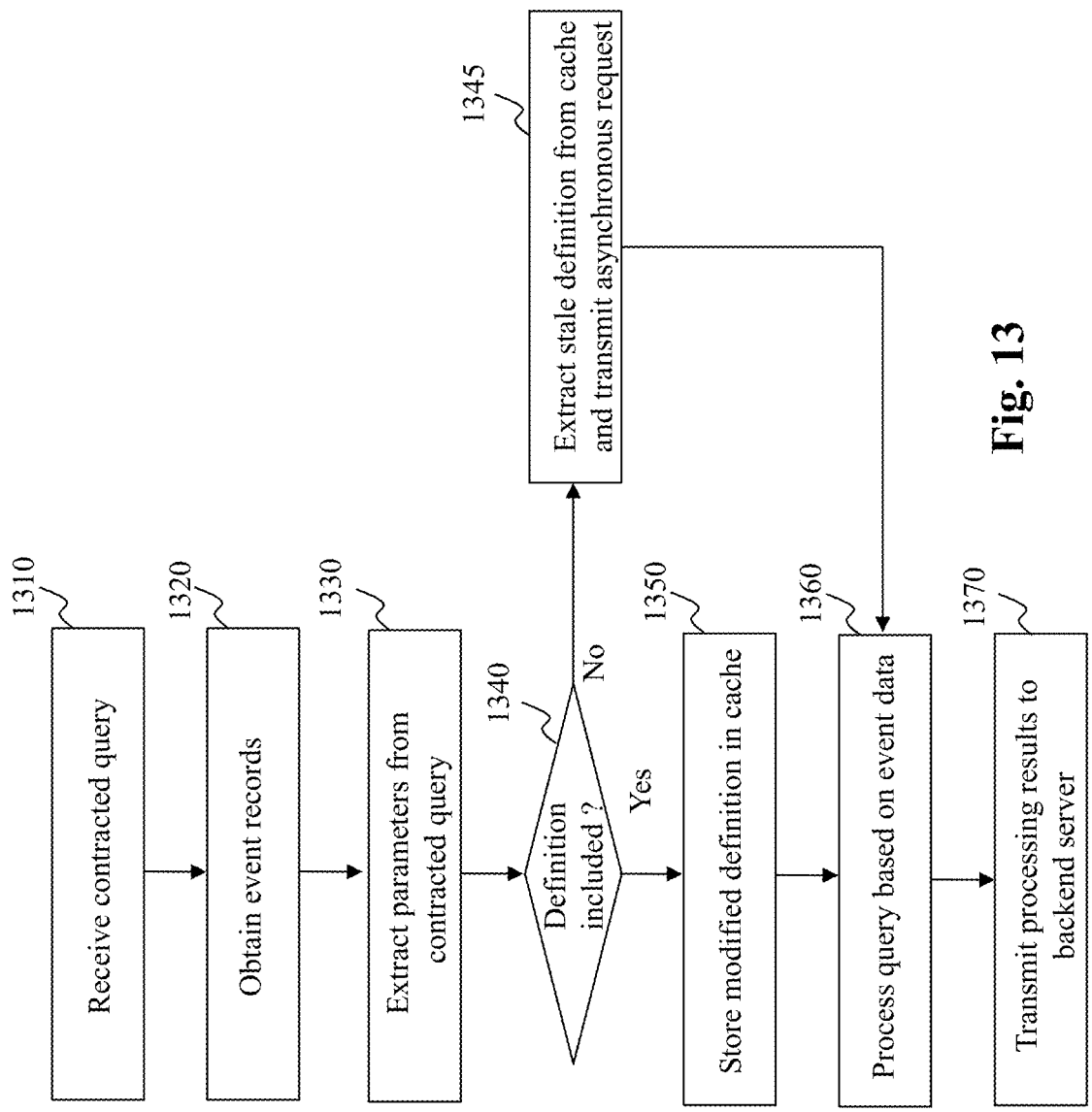
FIG. 13 is a flowchart of an exemplary process performed by a worker node, according to an embodiment of the present teaching.

FIG. 13 is a flowchart of an exemplary process performed by a worker node, according to an embodiment of the present teaching. The method commences in step 1310 wherein the worker node receives the contracted query. In step 1320, the worker node obtains event records. Further, in step 1330, the worker node extracts parameters included in the contracted query.

The process then moves to step 1340, wherein a query is performed to determine whether a definition associated with the Boolean expression is included in the contracted query. If the response to the query is affirmative, the process moves to step 1350. However, is the response to the query is negative, the process moves to step 1345.

In step 1345 (i.e., the case when the definition is not included in the contracted query), the worker node obtains a stale definition associated with the Boolean expression and proceeds to process the Boolean expression (step 1360) based on the stale definition. Additionally, the worker node also transmits an asynchronous request to the worker node controller indicating a request for an updated definition of the Boolean expression.

In step 1350, the worker node stores the extracted definition in its local database or the its in-memory cache. Thereafter the worker node processes the query in step 1360 to generate forecast records. The generated forecast records are transmitted to the backend server included in the forecasting engine in step 1370.

Figure 14:
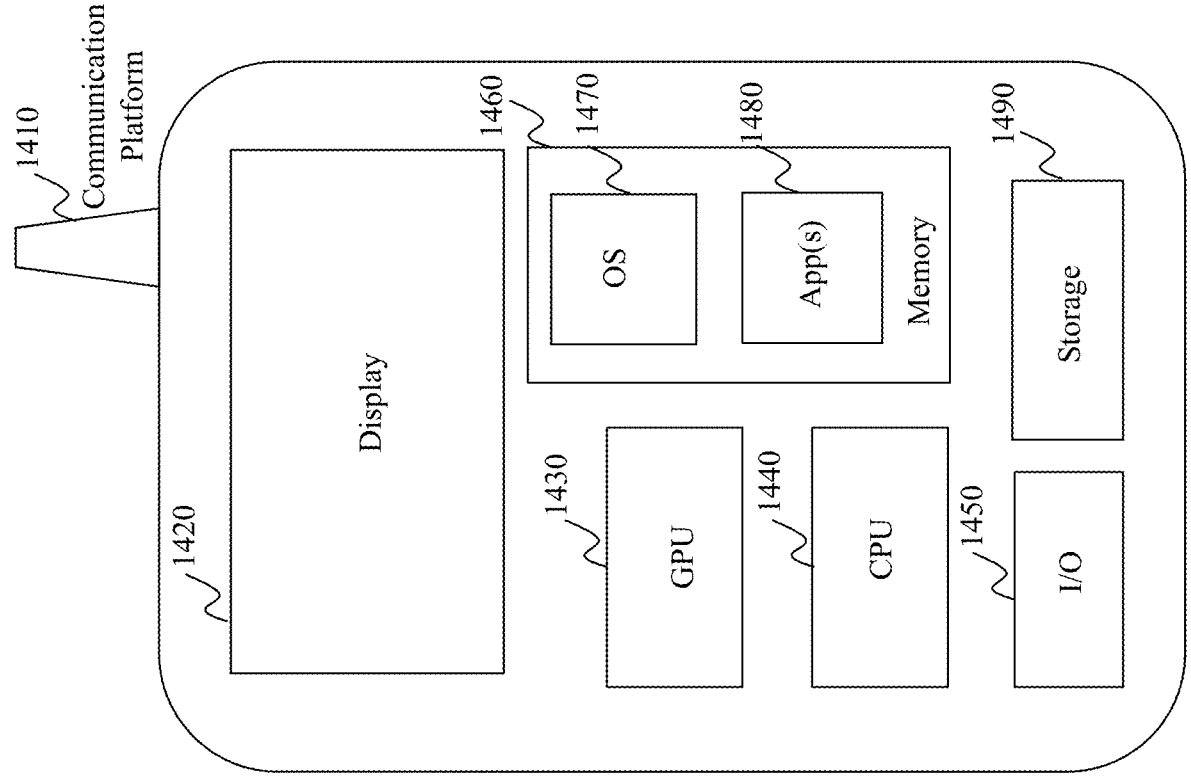
FIG. 14 depicts an architecture of a mobile device which can be used to implement a specialized system incorporating the present teaching.

Turning now to FIG. 14, there is depicted an architecture of a mobile device 1400, which can be used to realize a specialized system implementing the present teaching. In this example, a user device on which the functionalities of the various embodiments described herein can be implemented is a mobile device 1400, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1400 in this example includes one or more central processing units (CPUs) 1440, one or more graphic processing units (GPUs) 1430, a display 1420, a memory 1460, a communication platform 1410, such as a wireless communication module, storage 1490, and one or more input/output (I/O) devices 1450. Any other suitable component, including but not limited to a system bus or a controller (not shown), may also be included in the mobile device 1400. As shown in FIG. 14, a mobile operating system 1470, e.g., iOS, Android, Windows Phone, etc., and one or more applications 1480 may be loaded into the memory 1460 from the storage 1490 in order to be executed by the CPU 1440. The applications 1480 may include a browser or any other suitable mobile apps for performing the various functionalities on the mobile device 1400. User interactions with the content displayed on the display panel 1420 may be achieved via the I/O devices 1450.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
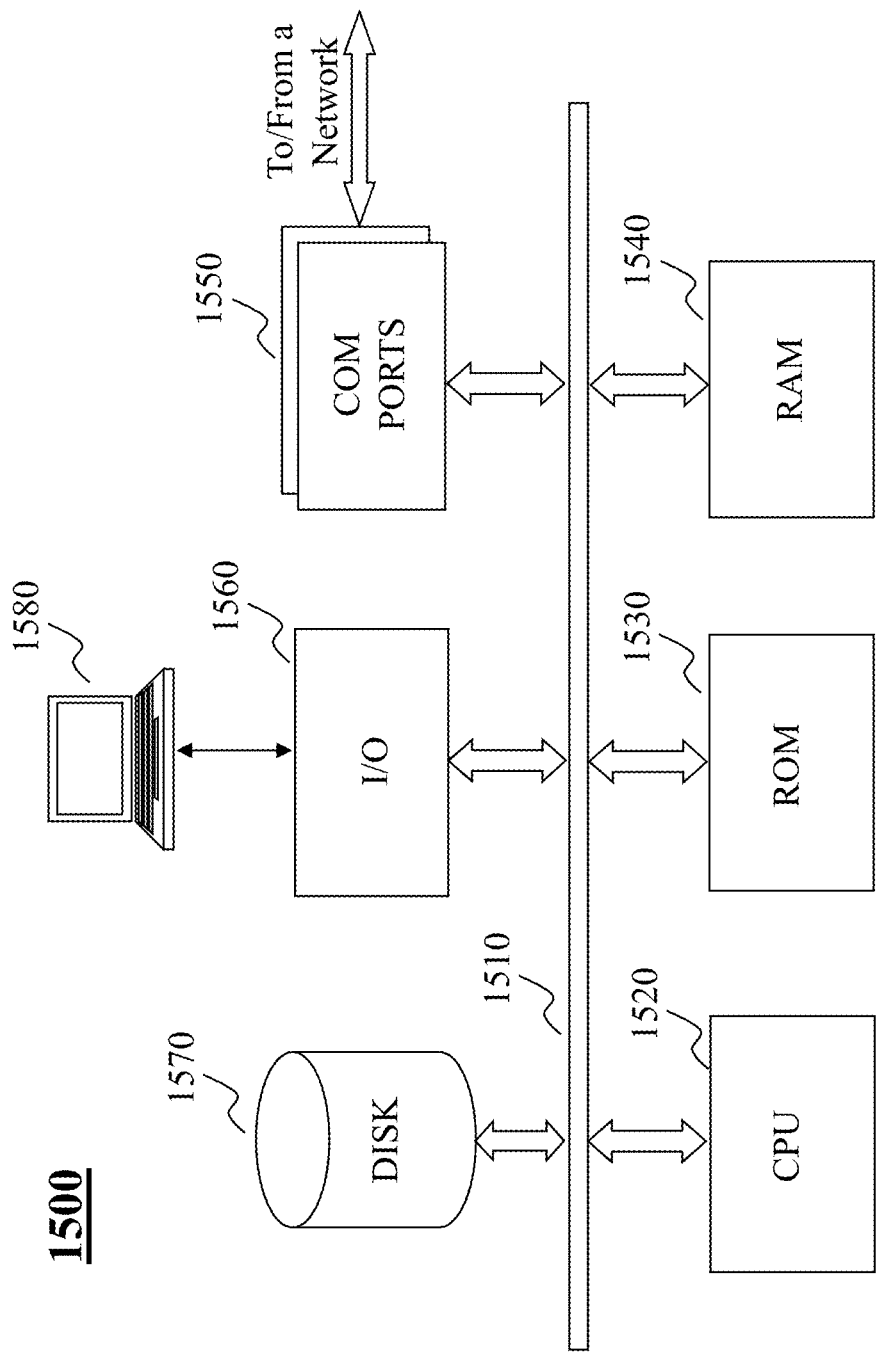
FIG. 15 depicts the architecture of a computer which can be used to implement a specialized system incorporating the present teaching.

FIG. 15 is an illustrative diagram of an exemplary computer system architecture, in accordance with various embodiments of the present teaching. Such a specialized system incorporating the present teaching has a functional block diagram illustration of a hardware platform which includes user interface elements. Computer 1500 may be a general-purpose computer or a special purpose computer. Both can be used to implement a specialized system for the present teaching. Computer 1500 may be used to implement any component(s) described herein. For example, the present teaching may be implemented on a computer such as computer 1500 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1500, for example, may include communication ports 1550 connected to and from a network connected thereto to facilitate data communications. Computer 1500 also includes a central processing unit (CPU) 1520, in the form of one or more processors, for executing program instructions. The exemplary computer platform may also include an internal communication bus 1510, program storage and data storage of different forms (e.g., disk 1570, read only memory (ROM) 1530, or random-access memory (RAM) 1540), for various data files to be processed and/or communicated by computer 1500, as well as possibly program instructions to be executed by CPU 1520. Computer 1500 may also include an I/O component 1560 supporting input/output flows between the computer and other components therein such as user interface elements 1580. Computer 1500 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the forecasting engine into the hardware platform(s) of a computing environment or other system implementing a computing environment or similar functionalities in connection with the forecasting engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the forecasting engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for evaluating expressions, the method comprising:
   obtaining an expression indicative of advertising criteria and metadata associated with the expression;
   determining, based on a comparison of the metadata to previously stored metadata associated with an earlier version of the expression, whether the expression corresponds to a modified version of the earlier version of the expression;
   in response to a determination that the expression is the modified version of the earlier version of the expression,
      receiving, by a worker node of a forecasting cluster, a query,
      if the query includes a definition of the modified expression,
         evaluating, by the worker node, the modified expression based on the definition, to generate a forecast record predicting a future event,
      if the query does not include the definition,
         evaluating, by the worker node, the modified expression based on a stale expression associated with the modified expression, to generate the forecast record, and
         causing, by the worker node, a worker node controller of the forecasting cluster to obtain the definition,
      storing the definition in a cache of the worker node, and
      sending the forecast record to a sever that is independent of the forecasting cluster; and
   in response to a determination that the expression does not have a corresponding earlier version of expression,
      invoking the server for evaluating the expression.

2. The method of claim 1, wherein the comparison of the metadata to the previously stored metadata includes a comparison of a version number associated with the expression extracted from the metadata to a previously stored version number associated with the expression.

3. The method of claim 1, wherein in response to the determination that the expression is the modified version of the earlier version expression, the method further comprises receiving, from the forecasting cluster, a result of evaluating the modified expression, and
   transmitting the query to the forecasting cluster, wherein the step of the transmitting further comprises:
   generating a key in accordance with a model; and
   extracting an attribute included in the metadata associated with the expression, wherein at least the key and the attribute are included in the query.

4. The method of claim 3, wherein the query is transmitted to a the worker node controller of the forecasting cluster, and wherein the worker node controller further transmits the query for evaluating the modified expression to the worker node included in the forecasting cluster based on a prioritization criterion.

5. The method of claim 3, further comprising
   generating, in accordance with another model, the definition included in the query.

6. The method of claim 4, wherein the worker node is configured for:
   extracting the key included in the query;
   retrieving from the cache, the definition based on the key; and
   evaluating the modified expression based on the definition.

7. The method of claim 6, further comprising:
   receiving, from the worker node, an asynchronous request to obtain the definition of the modified expression; and
   transmitting the definition in response to receiving the asynchronous request.

8. A non-transitory computer readable medium including computer executable instructions, wherein the instructions, when executed by a computer, cause the computer to perform a method for evaluating expressions, the method comprising:
   obtaining an expression indicative of advertising criteria and metadata associated with the expression;
   determining, based on a comparison of the metadata to previously stored metadata associated with an earlier version of the expression, whether the expression corresponds to a modified version of the earlier version of the expression based on the metadata;

in response to a determination that the expression is the modified version of the earlier version of the expression,
    receiving, by a worker node of a forecasting cluster, a query,
    if the query includes a definition of the modified expression,
        evaluating, by the worker node, the modified expression based on the definition, to generate a forecast record predicting a future event,
    if the query does not include the definition,
        evaluating, by the worker node, the modified expression based on a stale expression associated with the modified expression, to generate the forecast record, and
        causing, by the worker node, a worker node controller of the forecasting cluster to obtain the definition,
    storing the definition in a cache of the worker node, and
    sending the forecast record to a sever that is independent of the forecasting cluster; and
in response to a determination that the expression does not have a corresponding earlier version of the expression, invoking the server for evaluating the expression.

9. The medium of claim 8, wherein the comparison of the metadata to the previously stored metadata includes a comparison of a version number associated with the expression extracted from the metadata to a previously stored version number associated with the expression.

10. The medium of claim 8, wherein in response to the determination that the expression is the modified version of the earlier version of the expression, the method further comprises receiving, from the forecasting cluster, a result of evaluating the modified expression, and
    transmitting the query to the forecasting cluster, wherein the step of the transmitting further comprises:
    generating a key in accordance with a model; and
    extracting an attribute included in the metadata associated with the expression, wherein at least the key and the attribute are included in the query.

11. The medium of claim 10, wherein the query is transmitted to the worker node controller of the forecasting cluster, and wherein the worker node controller further transmits the query for evaluating the modified expression to the worker node included in the forecasting cluster based on a prioritization criterion.

12. The medium of claim 10, further comprising
    generating, in accordance with another model, the definition included in the query.

13. The medium of claim 11, wherein the worker node is configured for:
    extracting the key included in the query;
    retrieving from the cache, the definition based on the key; and
    evaluating the modified expression based on the definition.

14. The medium of claim 13, further comprising:
    receiving, from the worker node, an asynchronous request to obtain the definition of the modified expression; and
    transmitting the definition in response to receiving the asynchronous request.

15. A system for evaluating expressions, the system comprising:
    a modification detector configured for
        obtaining an expression indicative of advertising criteria and metadata associated with the expression,
        determining, based on a comparison of the metadata to previously stored metadata associated with an earlier version of the expression, whether the expression corresponds to a modified version of the earlier version of the expression; and
    a forecasting cluster configured for:
        in response to a determination that the expression is the modified version of the earlier version of the expression,
            receiving, by a worker node of the forecasting cluster, a query,
            if the query includes a definition of the modified expression,
                evaluating, by the worker node, the modified expression based on the definition, to generate a forecast record predicting a future event,
            if the query does not include the definition,
                evaluating, by the worker node, the modified expression based on a stale expression associated with the modified expression, to generate the forecast record, and
                causing, by the worker node, a worker node controller of the forecasting cluster to obtain the definition,
            storing the definition in a cache of the worker node, and
            sending the forecast record to a sever that is independent of the forecasting
        in response to a determination that the expression does not have a corresponding earlier version of the expression, invoking the server for evaluating the expression.

16. The system of claim 15, wherein the comparison of the metadata to the previously stored metadata includes a comparison of a version number associated with the expression extracted from the metadata to a previously stored version number associated with the expression.

17. The system of claim 15, further comprising an expression updater configured for in response to the determination that the expression is the modified version of the earlier version of the expression, receiving, from the forecasting cluster, a result of evaluating the modified expression,
    wherein the expression updater is further configured for transmitting the query to the forecasting cluster, and wherein the transmitting comprises:
    generating a key in accordance with a model; and
    extracting an attribute included in the metadata associated with the expression, wherein at least the key and the attribute are included in the query.

18. The system of claim 17, wherein the query is transmitted to the worker node controller of the forecasting cluster, and wherein the worker node controller further transmits the query for evaluating the modified expression to the worker node included in the forecasting cluster based on a prioritization criterion.

19. The system of claim 18, wherein the expression updater is further configured for:
    generating in accordance with another model, the definition included in the query.

20. The system of claim 18, wherein the worker node included in the forecasting cluster is configured for:
    extracting the key included in the query;
    retrieving from the cache, the definition based on the key; and
    evaluating the modified expression based on the definition.

* * * * *